United States Patent [19]
Lewis et al.

[11] 3,827,335
[45] Aug. 6, 1974

[54] FLUID SYSTEM WITH ANGULAR DISPLACEMENT SENSOR FOR AXIALLY RECIPROCATING SHAFT

[75] Inventors: Herbert J. Lewis, Hudson Falls; William H. Ziegler, Waterford, both of N.Y.

[73] Assignee: The United States of America as represented by the Secretary of the Army, Washington, D.C.

[22] Filed: July 10, 1973

[21] Appl. No.: 377,989

Related U.S. Application Data

[63] Continuation-in-part of Ser. No. 249,334, May 1, 1972, abandoned.

[52] U.S. Cl. ............... 91/3, 91/467, 92/2
[51] Int. Cl. ............ F15b 13/042, F15b 11/08
[58] Field of Search ........ 91/390, 467, 375, 3; 92/2

[56] References Cited
UNITED STATES PATENTS

| | | | |
|---|---|---|---|
| 2,244,296 | 6/1941 | Heinrich et al. | 91/375 |
| 2,436,424 | 2/1948 | Eastman | 92/2 |
| 3,122,062 | 2/1964 | Spivak et al. | 91/3 |
| 3,174,406 | 3/1965 | Hague et al. | 92/2 |
| 3,301,138 | 1/1967 | Cox | 92/2 |
| 3,417,667 | 12/1968 | Ikebe et al. | 91/375 |

*Primary Examiner*—Paul E. Maslousky
*Attorney, Agent, or Firm*—Edward J. Kelly; Herbert Berl

[57] ABSTRACT

The angular displacement of an axially reciprocating shaft is sensed by a fluid actuated sensor which generates signals responsive to the angular displacement and transmits them to a proportional fluidic amplifier which divides a controlled fluid flow proportional to the signals and directs the proportionally divided flows to a fluid responsive device.

5 Claims, 5 Drawing Figures

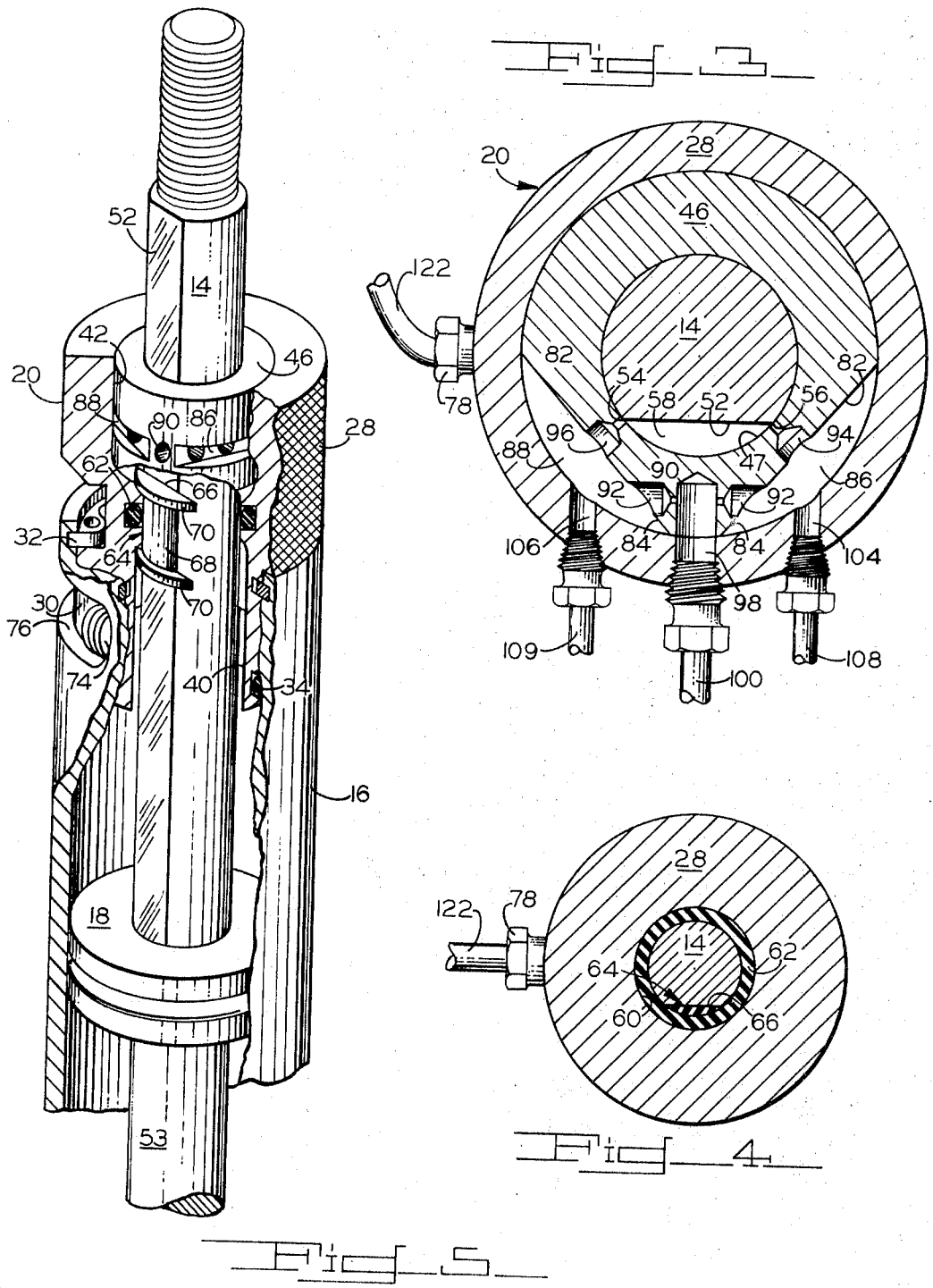

FLUID SYSTEM WITH ANGULAR DISPLACEMENT SENSOR FOR AXIALLY RECIPROCATING SHAFT

This invention described herein may be manufactured, used and licensed by or for the Government for governmental purposes without the payment to us of any royalty thereon.

This application is a continuation-in-part of applicants' copending previously filed patent application, Ser. No. 249,334, filed 1 May 1972, now abandoned.

BACKGROUND OF THE INVENTION

This invention relates to fluid actuated control systems whereby movement of a fluid responsive device is effected by an amplified signal transmitted thereto, and it pertains more particularly to a sensor device which senses angular displacement of an axially reciprocating shaft and responsive thereto generates and transmits a related fluid signal to a fluidic amplifier to effect a corresponding displacement of a fluid responsive device.

Recent developments in fluidic techniques have made available to ordnance designers, for instance, controls which are much more reliable than those previously available and which are affected less by those adverse conditions that decrease the reliability and accuracy of ordnance weapons. Because fluidic systems require very few moving parts their reliability is consequently increased over other known systems. They, too, are affected only slightly by extreme temperature changes, and by sudden shocks and periods of vibration to which ordnance guns are subjected when discharged. They also provide quick responses to signals, which add to their worth in the field of ordnance design as well as in other fields where similar conditions exist.

SUMMARY OF THE INVENTION

It is a principal object of this invention to provide a fluid responsive control system wherein angular displacement of an axially reciprocating shaft is sensed and signals relative to the displacement are generated, amplified and transmitted to a fluid responsive device for relative displacement thereof.

It is another object of this invention to provide a fluid actuated control system wherein angular displacement of an axially reciprocating shaft is sensed and signals proportional to the displacement are generated, amplified and transmitted to a fluid responsive device for proportional axial displacement of the shaft.

It is a further object of this invention to provide for such a system a simple, rugged and reliable sensor for sensing the angular displacement of the axially reciprocating shaft and transmitting to a fluidic amplifier signals relative to the angular displacement.

In the selected embodiment illustrating the invention, the control system is responsive to angular displacement of a shaft which is disposed for angular displacement during axial reciprocation and which is adapted to act as the rotor of a sensor for generating signals proportional to the angular displacement of the shaft and transmitting the proportional signals to the input legs of a fluidic amplifier whereby fluid pressures of greater magnitude are transmitted to a cylinder on opposite sides of a piston secured to one end of the shaft to move the shaft axially according to the signals generated by the sensor.

The specific nature of the invention as well as other aspects and advantages thereof will clearly appear from the following description of a preferred embodiment which is illustrated in the attached drawings.

BRIEF DESCRIPTION OF THE DRAWINGS

FIG. 3 is an enlarged cross-sectional view taken along line 3—3 of FIG. 2;

FIG. 4 is a cross-sectional view taken along line 4—4 of FIG. 2; and

FIG. 5 is an isometric view of the cylinder-piston assembly and the sensor device with some of the elements thereof partially broken away to show the interiors thereof.

DESCRIPTION OF A PREFERRED EMBODIMENT

Figure 1:
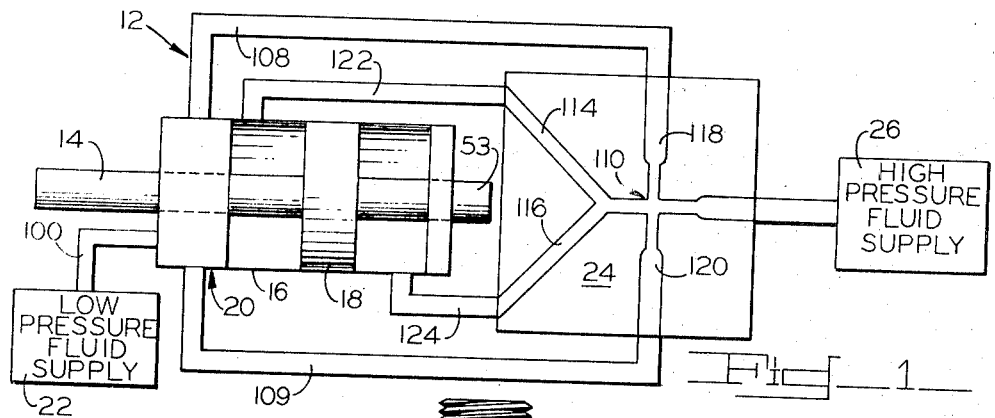
FIG. 1 is a schematic view of the fluid system of this invention.

Shown in the drawings is a fluid system 12 which is responsive to the angular displacement of a shaft 14 adapted for both axial and angular displacement. The fluid system 12 may, for example, be utilized in an automatic azimuth recovery system for cannons, such as that disclosed in the copending patent application of inventor William H. Ziegler, Ser. No. 266,802, filed June 27, 1972, now U.S. Pat. No. 3,782,243. System 12 comprises a cylinder 16 which is closed at one end 17 and a piston 18 which is fixed to one end of shaft 14 and is axially displaceable in such cylinder responsive to fluid pressure introduced thereinto at opposite ends thereof. Angular displacement of shaft 14 is sensed by sensor device 20 during axial reciprocation thereof and, responsive to the angular displacement, generates fluid signals from a low pressure fluid supplied from a source 22 and transmits them to a fluidic amplifier 24. By means of fluidic amplifier 24 the signals are amplified through control of high pressure fluid from a source 26 and are transmitted to either side of piston 18 in cylinder 16, according to the generated signals, for axial displacement thereof.

Sensor device 20 comprises a cylindrical body 28 having a reduced diameter portion 30 with an outside diameter essentially the same as the inside diameter of cylinder 16 so as to be accommodated for rotation in the open end thereof. A split ring 32 secures body 28 against axial displacement in cylinder 16 while permitting rotation relative thereto. An annular channel 34 in portion 30 receives an O ring 36 which provides a seal between the outside surface of body 28 and the inside surface of cylinder 16. A clearance 38 in body 28 permits insertion of a suitable tool by which split ring 32 is contracted for release of body 28 from cylinder 16.

Shaft 14 extends through an axial bore 40 in one end of body 28 and such bore is of larger diameter than the shaft to thereby provide a space therebetween. Body 28 is counterbored at 42 from the opposite end thereof to provide a shoulder 44 and such counterbore receives a sleeve 46 as by press fit so that such sleeve is retained against relative movement therein. Sleeve 46 has an axial bore 47 that receives shaft 14 with a close sliding fit. Located below shoulder 44 is an annular flange 48 with an inside surface 50 having approximately the same diameter as shaft 14. The cylindrical circumference of shaft 14 is interrupted by a chordal surface 52 thereby forming, along the length of the shaft that passes through bore 47 during reciprocal travel thereof, angular edges 54 and 56 at the junctions of the sides of the chordal surface with the cylindrical circumference of the shaft. Such chordal surface 52 also defines with the surface of bore 47, an exhaust chamber 58 which is open at both ends. An annular groove 60 in surface 50 receives an 0 ring 62 which provides a seal between such surface and the cylindrical circumference of shaft 14.

In order to effect a proper balance of low fluidic pressures on opposite sides of piston 18 during a normal condition, or at a preselected position, suitable means are provided. In the embodiment illustrated and described herein, such a suitable means is shown as an auxiliary shaft 53 of equal size to shaft 14 disposed to extend coaxially therewith on the opposite side of piston 18. The closed end 17 of cylinder 16 is provided with a central cylindrical opening for receiving a sleeve 49, similar to sleeve 46, as by press fit so that it is retained against relative movement with respect to end 17. The sleeve 49 is provided with an axial bore 51 that receives auxiliary shaft 53 with a close sliding fit. Axial bore 51 is provided with a centrally disposed annular groove 55 for receiving an 0 ring 63 which provides a seal between shaft 53 and sleeve 49.

A fluid seal is made between surface 50 and chordal surface 52 by a seal 64 which is of segmental configuration with a flat surface 66 and a cylindrical surface 68. Cylindrical surface 68 has the same radius as shaft 14 and flat surface 66 has the same width as chordal surface 52 so that the cylindrical surface of the shaft is completed when such flat surface is in contact with the chordal surface. One of a pair of annular ribs 70 extends radially from one end of seal 64 and the other extends radially from the opposite end thereof and such ribs receive flange 48 therebetween to prevent axial displacement of the seal respective to body 28. When seal 64 is positioned by insertion into bore 40 and then contacted by shaft 14 when subsequently inserted thereinto, 0 ring 62 has sealing contact with cylindrical surface 68 of the seal and the compression of the 0 ring thereagainst presses flat surface 66 against chordal surface 52. Seal 64 is fabricated as from teflon so that the pressure of flat surface 66 against chordal surface 52 forms a sealing contact therebetween. Through such contact, too, seal 64 is rotatable with shaft 14.

A threaded orifice 74 in body 28 provides communication between the outside circumference of reduced portion 30 thereof and bore 40 and an angularly elongated slot 76, which is formed in cylinder 16 for registry with such orifice, provides a clearance that permits free relative movement between such cylinder and body 28 when a fitting 78 is threaded into such orifice so as to extend from the cylinder. Another threaded orifice 80 is provided through cylinder 16 adjacent the closed end thereof.

Referring to FIG. 3, it is seen that there is provided in sleeve 46 equidistant from the opposite ends thereof a pair of segmental channels 82 which are angularly related to each other with ends 84 thereof spaced closer together than the opposite ends. Channels 82 are closed by the circumferential surface of counterbore 42 to form a right chamber 86 and a left chamber 88.

A closed end well 90 extends radially into sleeve 46 from the outside circumference thereof between ends 84 and such well has fluid communication with right chamber 86 and left chamber 88 by means of apertures 92. A right nozzle 94 provides communication between right chamber 86 and bore 47 and a left nozzle 96 provides communication between left chamber 88 and the bore. Nozzles 94 and 96 are so located that they are bisected equally by edges 54 and 56 when shaft 14 is located angularly at a pre-selected position. When shaft 14 is displaced angularly from the pre-selected position, one of the nozzles 94 or 96 is opened accordingly and the opposite one is closed an equal amount. Upon greater angular displacement, one of the nozzles 94 or 96 is fully open to chamber 58 and the other is fully blocked by the cylindrical circumference of shaft 14.

Communication is made with well 90 through body 28 by means of a duct 98 whereby low pressure fluid of approximately 5-7 psi is transmitted by means of a flexible conduit 100 from a source 22 to the well. An aperture 104 extends through body 28 for fluid communication with right chamber 86 and a similar aperture 106 extends through the body for fluid communication with left chamber 88 and such apertures communicate by means of flexible conduits 108 and 109 respectively with fluidic amplifier 24.

Fluidic amplifier 24, as shown in FIG. 1, is of conventional type and comprises a junction 110 to which a controlled fluid flow at approximately 30 psi is conducted from source 26. Two branches, including a right passage 114 and a left passage 116, extend from junction 110 in a "Y" configuration so that the controlled fluid may be directed at such junction into either passage with practically no loss in momentum, in a well-known manner. Proportional deviation of the controlled fluid flow into passages 114 and 116 is controlled by the low pressure fluid conducted from apertures 104 and 106 to input legs 118 and 120, respectively, by the related conduits 108 and 109.

Legs 118 and 120 of fluidic amplifier 24 are located in the same plane as passages 114 and 116 and extend into junction 110 from opposite sides thereof, as shown in FIG. 1, so as to direct the low pressure fluid flows from legs 118 and 120 against the controlled fluid flow from source 26 at the junction whereby the controlled fluid flow is divided between passages 114 and 116 according to the low pressure flow from sensor device 20. The controlled fluid flow is conducted from right passage 114 and left passage 116 to orifices 74 and 80 by conduits 122 and 124, respectively, to displace piston 18 linearly in cylinder 16 according to the signals generated by the angular displacement of shaft 14 relative to sensor device 20.

In the preferred embodiment described hereinbefore, any angular displacement of shaft 14, which is also subject to axial reciprocation, is sensed by sensor device 20 and is converted through fluid system 12 to proportional displacement of a fluid responsive device such as piston 18. In the described embodiment, shaft 14 is responsive to reciprocal displacement of piston 18 by being fixed thereto, and such reciprocation is responsive to the angular displacement of the shaft. However, it is pointed out that shaft 14 may be reciprocated by any other means and the fluid responsive device may be in any other form.

In the illustrated embodiment, piston 18 is normally located intermediately between the limits of its displacement in cylinder 16 and shaft 14 is located at a pre-selected position where edges 54 and 56 thereon bisect the related nozzles 94 and 96 equally. Thus, nozzles 94 and 96 vent from chambers 86 and 88 into chamber 58 and therefrom to the ambience equal amounts of the low pressure fluid conducted to well 90 from source 22. Consequently, the amount and pressure of the low pressure fluid which is conducted from each of the chambers 86 and 88 through the respective apertures 104 and 106 to the related legs 122 and 124 of fluidic amplifier 24 are equal. Therefore, the high pressure controlled fluid which is injected into junction 110 is divided equally between right passage 114 and left passage 116 so that equal pressure is applied to opposite sides of piston 18 in cylinder 16 and thereby the piston is held stationary therein in whatever axial position shaft 14 should be located, because of the extension of chordal surface 52 therealong.

Figure 2:
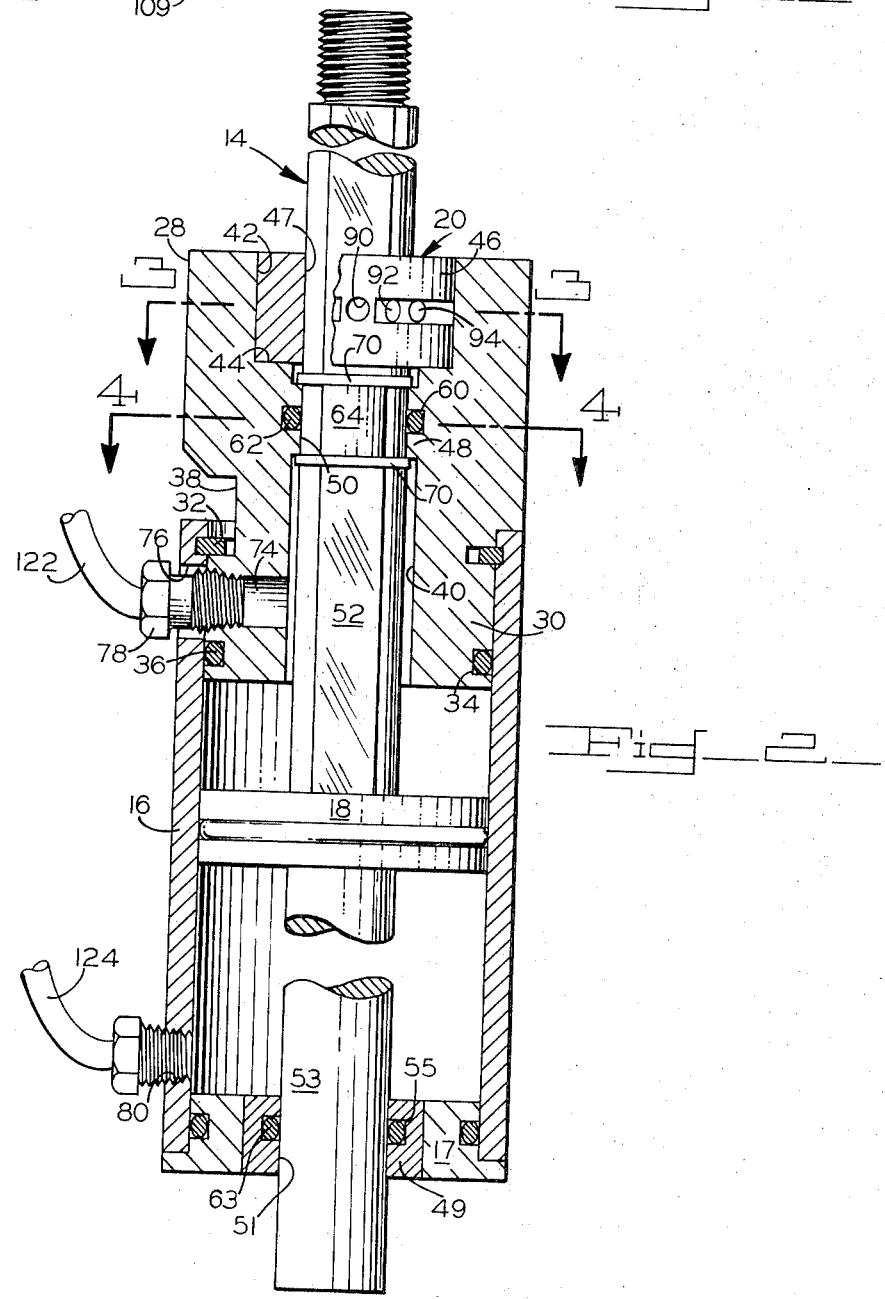
FIG. 2 is a cross-section of the cylinder-piston assembly, partly broken away, and the sensor device.

Referring to FIG. 3, if shaft 14 should be displaced in counter-clockwise direction, left nozzle 96 would be at least partially blocked and right nozzle 94 would be opened accordingly. Thus, more of the low pressure fluid would be vented from right chamber 86 than left chamber 88 so that the fluid signal transmitted to right leg 118 of fluidic amplifier 24 would be stronger than that transmitted to left leg 120. This would effect a greater transmission of the high pressure fluid from left passage 116 to orifice 80 than from right passage 114 to orifice 74. Consequently, piston 18 will be displaced upwardly in cylinder 16, as shown in FIG. 2, until shaft 14 is rotated in the opposite direction back to the pre-selected position. If, instead, shaft 14 should be originally rotated in a clockwise rotation, as referring to FIG. 3, the fluid signals and reactions would, naturally, be the reverse. Also, if shaft 14 should be rotated to the extent that one of the nozzles 94 or 96 is entirely uncovered and the other is entirely blocked a saturated signal is produced by sensor device 20 with maximum and immediate results being effected respective to the displacement of piston 18.

The pre-selected position of sensor device 20 is adjusted by rotation of body 28 in cylinder 16 to thereby change the position of nozzles 94 and 96 relative to edges 54 and 56 on shaft 14.

It will become obvious to persons skilled in the art that forms other than the single embodiment shown and described herein are possible within the spirit and scope of the present invention. Therefore, it is desired that the present invention shall not be limited except insofar as it is made necessary by the prior art and by the spirit of the appended claims.

We claim:

1. The combination comprising a shaft having a circumferential surface of a cylindrical configuration and disposed both for axial reciprocation and angular displacement, a fluid responsive system, a sensor device responsive to the angular displacement of said shaft and disposed for generating fluid signals relative to angular displacement, means for amplifying the fluid signals and applying them to said fluid responsive system for actuation thereof, a source of low pressure fluid and means for conducting said low pressure fluid to said sensor device, and wherein said sensor device comprises a sleeve having a bore adapted for slidingly receiving said shaft, a chordal surface of said shaft interrupting said circumferential surface at least along the length thereof that passes through said sleeve during reciprocation of said shaft, an exhaust chamber defined by said chordal surface and the surface of said bore, said exhaust chamber being open to the ambience, means for venting to said exhaust chamber a portion of the low pressure fluid conducted to said sensor device proportional to the angular displacement of said shaft, and means for applying the remaining portion of the low pressure fluid to said fluid responsive device for responsive actuation thereof.

2. The invention as defined in claim 1 wherein said sensor device comprises a pair of chambers located in said sleeve, means for dividing said low pressure fluid conducted to said sensor device into two equal fluid flows, means for conducting each of the fluid flows to the related one of said chambers, a nozzle for expelling the fluid flow from each of said chambers into said exhaust chamber, an edge extending along each side of said chordal surface, said edges being disposed in cooperation with said nozzles for varying in inverse proportions according to the angular displacement of said shaft the fluid flows expelled from said chambers into said exhaust chamber.

3. The invention as defined in claim 2 wherein said amplifying means comprises a fluidic amplifier having a junction and two passages in "Y" relationship extending therefrom, means for conducting the low pressure fluid flows from said chambers to said fluidic amplifier on opposite sides of said junction, a source of high pressure fluid, means for conducting the high pressure fluid to said junction, means in said fluidic amplifier for dividing the high pressure fluid into said two passages responsive to the respective pressures of the low pressure fluid flows, and means for conducting the divided high pressure fluid from said passages to said fluid responsive device for actuation thereof.

4. The invention as defined in claim 2 wherein said fluid responsive system comprises a cylinder open at one end, means for applying the divided high pressure fluid to opposite ends of said piston for reciprocal displacement thereof in said cylinder, said piston being fixed to said shaft for transmitting the reciprocal displacement of said piston thereto, and wherein said sensor device comprises a body mounted in the open end of said cylinder for rotation therein, a counterbore in said body for receiving said sleeve as by press fit for transferring rotation of said body thereto, means for sealing fluid tight the interfaces of said body and said cylinder, an axial bore in said body extending coaxially from said bore in said sleeve for receiving said shaft, and means for sealing fluid tight the junction between said bore and said shaft.

5. The invention as defined in claim 4 wherein said means for sealing fluid tight the junction between said bore in said body and said shaft comprises an annular flange disposed in said body, said flange having an inner surface having approximately the same diameter as the outside diameter of said shaft, an annular channel disposed in said inner surface for receiving an O ring for sealing contact with said circumferential surface of said shaft, and a seal of segmental configuration having a cylindrical surface with the same radius as said circumferential surface of said shaft and a flat surface having the same width as said chordal surface thereby to complete the cylindrical configuration of said shaft when said flat surface and said chordal surface are in contact, and a pair of ribs extending radially from said cylindrical surface for receiving said flange therebetween to retain said seal against axial displacement relative to said body.

* * * * *